United States Patent [19]
Wiklund

[11] Patent Number: 5,249,645
[45] Date of Patent: Oct. 5, 1993

[54] PRESSURE FLUID ACTUATED LUBRICATOR

[76] Inventor: Henry W. Wiklund, Bäckvägen 1, Arbra, Sweden

[21] Appl. No.: 941,540

[22] Filed: Sep. 8, 1992

[51] Int. Cl.⁵ .................. F16N 11/10; F16N 13/16
[52] U.S. Cl. ........................ 184/29; 184/39; 184/55.1; 184/108; 222/319; 417/368; 417/375; 417/400
[58] Field of Search ............... 184/29, 39, 55.1, 55.2, 184/105.2, 108, 109; 222/319, 320, 386, 389; 417/368, 375, 392, 400; 92/117 A

[56] References Cited

U.S. PATENT DOCUMENTS

| | | | |
|---|---|---|---|
| 1,721,127 | 7/1929 | Lilly | 417/460 |
| 3,040,835 | 6/1962 | Ahnert | 184/55.2 |
| 3,205,825 | 9/1965 | Kojabashian et al. | 417/400 X |
| 3,958,663 | 5/1976 | Moore | 184/108 X |
| 3,990,538 | 11/1976 | Casey et al. | 184/109 |
| 4,161,711 | 7/1979 | Meister | 337/273 |
| 4,599,911 | 7/1986 | Rosell | 92/117 A X |

FOREIGN PATENT DOCUMENTS

| | | | |
|---|---|---|---|
| 1906977 | 9/1969 | Fed. Rep. of Germany | 417/400 |
| 407075 | 3/1934 | United Kingdom | 417/460 |

*Primary Examiner*—Thomas E. Denion
*Attorney, Agent, or Firm*—Eric Y. Munson; Mark P. Stone

[57] ABSTRACT

A pressure fluid actuated lubricator having a housing (46), a pressure fluid channel (43, 42, 21) leading from an inlet opening (2) to an outlet opening (7), a reservoir (44) for a lubricant and a discharge device (19) for the lubricant. The reservoir (44) is arranged to be movable by being acted on by the pressure fluid and transfers the pressure force to the lubricant and the discharge device (19). The reservoir is sealed against the penetration of pressure fluid and decreases in effective volume in proportion to the discharged amount of lubricant.

6 Claims, 1 Drawing Sheet

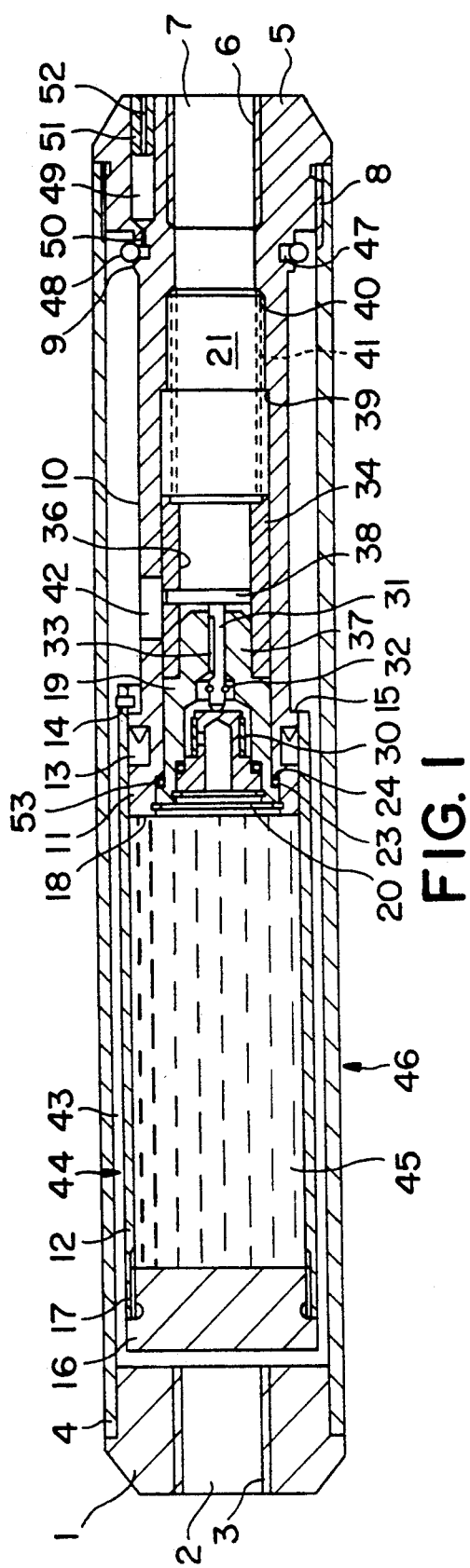
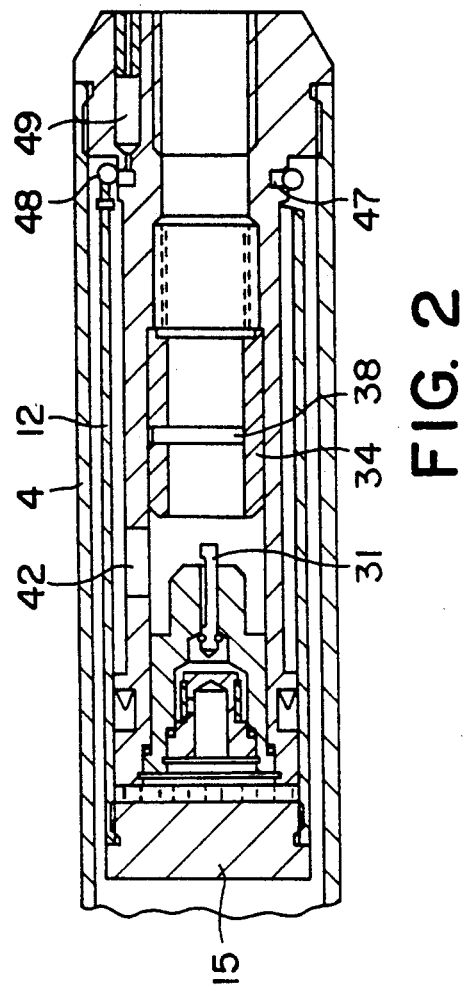
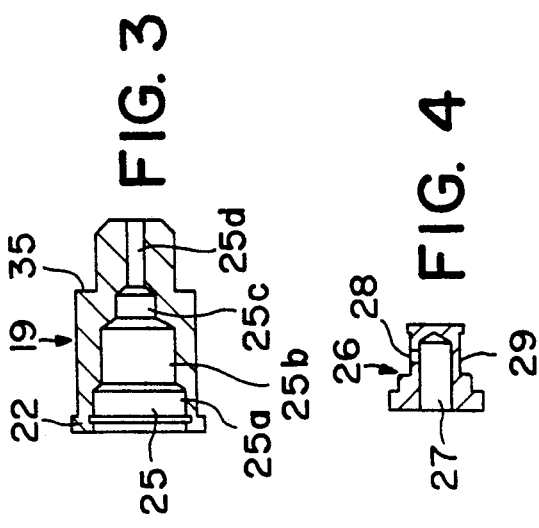

PRESSURE FLUID ACTUATED LUBRICATOR

The present invention relates to a lubricator intended to be connected to a pressure fluid line, such as a compressed air line, and, by a short impulse, to feed a lubricant to the line each time a flow of pressure fluid is started on the starting of a pressure fluid operated device, such as a tool, connected to the line downsteam of the lubricator; the lubricant being fed, thereby, to the said device.

More specifically, the invention refers to a lubricator of the said kind which is particularly suitable for feeding out lubricant regardless of the position it is assuming and which can be connected close to the device which it is to serve and is insensitive to rough treatment.

A typical field of application for the lubricator in accordance with the invention is air tools. For the sake of simplicity it will therefore, in the following description, mainly be referred only to compressed air and air tools, which does not imply that the invention is limited to such tools, but it can also embrace other pressure fluid operated devices. Also, for the sake of simplicity, the term "oil" is mostly used to designate the lubricant, since oil is commonly used in the types of lubricator referred to herein.

STATE OF THE ART

Certain air tools and machines, for example rock drills, chipping hammers, scaling hammers and grinders, are used in very varying working positions and, many times, in such a way that they are most of the time pointed in other directions than downwards. Furthermore, they are used over large working areas and are, therefore, connected to long compressed air hoses. The majority of existing lubricators for air tools are orientation dependent, i.e. they must be fitted in such a way that the compressed air acts from above on the surface of the oil in their oil reservoir, the discharge valve assuming a lower position. Furthermore, these lubricators are as a rule not capable of enduring rough treatment, since in order to obtain indication of the oil level in the reservoirs the latter are made of transparent materials or fitted with a sight glass and must be protected against impact forces and/or scratching and dirtying. Therefore, these lubricators cannot, under the mentioned conditions, be fitted on the tools or on air hoses close to the latter, since on the one hand they will most of the time be oriented in the wrong direction and, on the other hand, will not be able to endure the treatment to which they are subjected when being dragged about with the hose.

Attempts have been made at designing lubricators which are not orientation dependent and which can endure being fitted direct on, and dragged about with, the air hose. For example, the U.S. Pat. No. 3,040,835 describes a lubricator having a mainly cylindrical housing 11. The cylindrical wall of this housing is formed by an outer tube inside which an inner tube 29 defines the side walls of an oil reservoir. One end wall of the reservoir is formed by a piston 36 which is movable in the inner tube. The piston is acted on by the air pressure and will successively move deeper into the inner tube or oil reservoir as oil is discharged from said reservoir. In this way, the effective volume of the reservoir is reduced in relation to the amount of oil leaving it. Therefore, no air pocket can be formed at the discharge opening of the reservoir, but oil will be discharged regardless of what position the lubricator is assuming.

When a tool connected to the air line is operated, air enters through one end wall of the lubricator housing, passes between the inner tube and outer tube and leaves through the opposite end wall. An underpressure is created at the outlet end of the reservoir, a slightly higher pressure simultaneously acting on the piston 36 and causing oil to be discharged.

When the oil reservoir is full and the piston is therefore at the extreme end of the inner tube, the piston is not only subjected to the static air pressure, but also to the dynamic force of the air streaming past it. However, as the piston moves into the inner tube, it is no longer in the direct path of the air stream. Instead, a very unpredictable kind of turbulence is created inside the open end of the tube, as the air stream directed into it turns and passes out again over its edges. This will result in considerable variations of the force acting on the piston, depending on how far into the inner tube the piston has travelled. Furthermore, a compression spring 41 is provided inside the oil reservoir to act on the piston. The resistance of the spring increases, as the piston moves in the tube.

Considering these variations in the forces acting on the piston, and the limited motive power (the slight underpressure at the reservoir's outlet end) available to operate the spring-loaded discharge valve and ensure that the desired oil feed rate is maintained, it will hardly be possible to arrive at a reliable functioning of the device.

In the lubricator discussed, the piston is arranged to move a shut-off valve 43 into a position where it shuts off the air when the oil reservoir is empty. This in order to signal that it is time for oil replenishment. The shutting off of the air in the middle of a work operation can sometimes be highly undesirable and inconvenient.

The object of the present invention is to produce an improved lubricator of an orientation independent type which has a more reliable function and a less inconveniencing way of indicating that the oil in the reservoir is used up, as shall be described further below.

SUMMARY OF THE INVENTION

The object of the present invention is to produce a lubricator which can operate totally independently of the position it is assuming and which, regardless of the position assumed, is capable of discharging substantially the total contents of its oil reservoir, which can endure hard treatment, such as when being fitted direct on an air tool or a hose of such a tool, which produces a clear signal for oil replenishment when its oil reservoir is nearly empty and which can be designed to provide for a very small, momentaneous oil dosage as well as a continuous dosage, depending on the requirement of the tool or machine which the device is to serve.

These objects have been attained with the lubricator in accordance with the invention such as it is defined in the Claims.

SHORT DESCRIPTION OF THE ATTACHED DRAWING

FIGS. 1 and 2 show side elevations of the lubricator; according to FIG. 1 in a position in which the reservoir of the device is completely filled with oil, and according to FIG. 2 in a position in which it is substantially emptied. Furthermore, the Figures show different positions of valve devices of the lubricator for the compressed air flow and the discharge of oil.

FIGS. 3 and 4 show, for purposes of elucidation, side elevations of a non-return valve and a valve housing which form part of the oil discharge device of the lubricator.

DETAILED DESCRIPTION OF AN EMBODIMENT OF THE INVENTION

According to the embodiment described in the following, and with reference to FIGS. 1–4, the lubricator has a substantially cylindrical shape and shows at its inlet end an inlet part 1 with an inlet opening 2 for compressed air and, in this opening, a connection thread 3 for a coupling nipple of the common type for the connection of the lubricator to a compressed air line. The inlet part 1 is fixedly connected with an outer tube 4 which, at the opposite end of the lubricator, is threaded onto an outlet part 5 by means of a thread joint 6. The outlet part 5 has an outlet opening 7 for compressed air and, in this opening, a connection thread 8 for a coupling nipple for a compressed air hose. The outlet opening 7 forms the outermost portion of a bore 21 which extends through the entire length of the outlet part 5.

At the end of the thread joint 6, the outlet part 5 is continued by narrower portions 9, 10, 11, which extend into the outer tube 4, with a play against the tube. On the portion 11 of the outlet part, an inner tube 12 is displaceably arranged which is sealed against the outlet part by means of a seal ring 13. A stop 14 limits the displaceability of the inner tube 12 in relation to a shoulder 15 on the portion 11. The inner tube 12 is terminated, at one end, by a cover 16 which is affixed to the tube by means of a thread joint 17.

The portion 11 of the outlet part 5 is terminated by an end wall 18 through which one end of the through bore 21 of the outlet part debouches. From this end, a valve housing 19 is inserted into the bore and is retained by a lock ring 20 and by contact by means of a shoulder 22 against a seal ring 23 which, in its turn, contacts a shoulder 24 in the bore 21. The valve housing 19 has a through hole 25 which from one of its ends 25a is continued by narrower portions 25b, 25c and, at its other end, 25d. Into the valve housing, a non-return valve 26 is inserted and retained by means of a lock ring 54 and sealed against the wall portions 25a, 25b of the housing by means of a seal ring 53. In one end wall of the non-return valve a hole 27 is made which communicates with another hole 28 through one of its side walls. A portion 29 of the non-return valve is surrounded by a resilient seal ring 30 which covers the hole 28.

In order to increase the resiliency of the ring it can be slitted so that it does not continue unbroken around its entire circumference. If made in this way, it should also be secured against turning to prevent the slit where the ring is divided from coming above the hole 28.

Into the narrowest portion 25d of the valve housing, a dosage piston 31 is inserted. The piston is, at one end, provided with a stop having a larger diameter than the narrow hole portion 25d, which stop can comprise a sealing member 32. Along part of its length, the piston is provided with a plane surface or a groove 33.

Inside the valve housing 19, in the bore 21, a tubular compressed air valve 34 is arranged which with a small play fits in the bore 21. The valve 34 is movable back and forth and rests, in one end position, against a shoulder 35 of the valve housing 19; an internal circumferential wall 36 enclosing with a small play, in this position, a portion 35 of the valve housing which extends from the shoulder 35. Through a side wall of the compressed air valve a pin 38 is inserted which, at one end position of the valve, contacts an end of the dosage piston 31 which protrudes from the valve housing 19. A shoulder 39 in the bore 21 serves as a stop at the opposite end position of the compressed air valve. Another shoulder 40 in the bore forms a seating for a compression spring 41 which affects the compressed air valve in a direction towards the valve housing 19.

In the portion 10 of the outlet part, a transverse hole 42 is made which communicates with the bore 21 and which is blocked by the compressed air valve 34 in the end position of the valve shown from FIG. 1 but is freed in the end position shown from FIG. 2. In the latter case, a continuous compressed air channel 43, 42, 21, composed of the ring-shaped passages, commonly designated 43, which are formed between the outer tube 4 and the inner tube 12 and the portion 10 of the outlet part, as well as the hole 42 and the bore 21 in the outlet part 5.

The inner tube 12, the cover 16 and the end wall 18 of the outlet part with the connecting end surfaces of the valve housing 19 and the non-return valve 26 define a reservoir 44 for a lubricant 45. The reservoir is enclosed by a housing 46 formed by the inlet part 1, the outer tube 4 and the connecting threaded end of the outlet part 5.

In the portion 9 of the outlet part 5, a groove 47 is made, the opening of which is covered by an O-ring 48. The ring is thicker than the width of the groove, so that it can only to a small extent penetrate into it. The groove 47 communicates with a hole 49 leading from the outer end of the outlet part 5, which hole closest to the groove has a portion 50 with a small sectional area.

The lubricator in accordance with the invention is filled, before use, with a lubricant, usually an oil of a suitable quality for the tool or machine to be lubricated. During the filling operation, the lubricator should not be connected to a compressed air line. The outer tube 4 with the inlet part 1 fixed to it is unscrewed from the outlet part 5. The cover 16 is unscrewed from the inner tube 12 which is pulled out into the position shown from FIG. 1, if it is not already in this position. Oil is poured into the inner tube to a level just below its rim, whereupon the cover 16 is replaced and screwed to pressure-tight connection against the tube. The lubricant reservoir 44 is now completely sealed off against the environment by means of the cover 16 and the seal rings 13, 23 and 30.

The outer tube 4 with the inlet part 1 fixed to it is screwed to pressure-tight connection against the outlet part 5, whereupon the lubricator is ready for connection and use. The inlet opening 2 is connected to a line from a pressure fluid source, such as a compressor. Suitably, the male part of a quick-action coupling is screwed into the inlet opening and connected with a female part fitted on the air line, the female part being made, in the common way, to shut off the line when the lubricator is disconnected by removal of the male part from the female part.

In a similar way, the outlet opening 7 is connected to a line which with its opposite end is connected to a tool or a machine which is to be driven by the compressed air. It is suitable to connect the female part of a quick-action coupling with the lubricator and the male part with the line, so that the outlet of the lubricator is closed if the male part of the line is disconnected when the lubricator is pressurized.

When the lubricator is connected as described above, but the tool is not operated and there is therefore no flow of compressed air, the compressed air valve 34 is, by being affected by the compression spring 41, kept in the position shown from FIG. 1. The valve blocks the connection between the compressed air channel's portion 43 and the rest of the channel up to the outlet opening 7.

When a connected tool is started, a discharge of compressed air from the tool begins which creates an underpressure downstream of the blocked connection. A rapid drop of pressure results at the downstream end of the compressed air valve 34 and at the end of the dosage piston 31 which is in contact with the pin 38, as compressed air is flowing out through the outlet opening 7. An overpressure will, consequently, act against the upstream end of the compressed air valve 34 which rests against the shoulder 35 of the valve housing, since the valve is not sealing completely against the shoulder and the channel portion 43, but a certain play exists. Due to the overpressure and the dynamic force of the passing compressed air, the compressed air valve is very rapidly moved to the end position shown from FIG. 2. The passage from the channel portion 43 through the valve and up to the outlet opening 7 is now freed, so that the pressure variations between the different channel portions are substantially eliminated.

When the compressed air valve performs its abovementioned movement to the position in accordance with FIG. 2, the pin 38 stops pressing against the end of the dosage piston 31 which can now move freely in the hole 25d of the valve housing.

Since, when the abovementioned pressure drop occurs, the compressed air valve 34 must move forwards a short distance before the blocking of the channel portion 43 ceases, a considerable drop of pressure results before the pressure is again equalized. A considerable overpressure will therefore act against the outer end surface of the cover 16, which is upstream of the point of blockage, and will, due to the mobility of the reservoir wall 12, be transferred to the lubricant 45. The latter acts against the seal ring 30 of the non-return valve, which is lifted from its sealing contact against the orifice of the valve's outlet hole 28 and permits a small quantity of oil to pass into the hole portions 25b, 25c of the valve housing. Consequently, the same overpressure results in those hole portions and acts on the dosage piston 31. The compressed air valve 34 having moved forward and its pin 38 having lost contact with the dosage piston, the piston is free to move forwards. During part of the piston movement, a small quantity of oil can pass from the valve housing 19 through the interstice between the dosage piston and the hole 25d of the valve housing which is formed by the groove or planed portion 33 of the piston. On both sides of the portion 33, the piston fits closely against the hole 25d, so in both end positions it seals against oil leakage and permits such leakage only when moving between the end positions. The discharge of oil stops, therefore, as soon as the dosage piston has completed its feeding movement. Simultaneously, the seal ring 30 of the non-return valve resumes its sealing position.

The oil which has been discharged past the dosage piston 31 to the bore 21 is by the flow of compressed air carried to the tool or the like which is connected to the compressed air line.

The flow of compressed air retains the compressed air valve 34 in the position shown by FIG. 2 until the flow is interrupted when the tool is stopped, upon which the compression spring 41 returns the valve to the position shown from FIG. 1. The valve moves easily in the bore 21, and the spring 31 can therefore be made very weak and is easily overcome by the dynamic flow forces which act on the pin 38 and other surfaces. Therefore, the spring will not, to any appreciable degree, produce a throttling effect on the compressed air flow.

When the compressed air valve 34 returns to its position in accordance with FIG. 1, the pin 38 will also be pushed back into the position shown by the same Figure. During this return movement, too, of the dosage piston, a small quantity of oil may be forced out past it, since the piston movement into the valve housing 19 produces a certain overpressure in the latter and the non-return valve 30 is closed.

Each discharge of oil through the non-return valve 26 and past the dosage piston 31 results in an extremely short forward movement of the cover 16 and the inner tube 12. These parts will therefore very slowly move towards the position shown from FIG. 2, in which the reservoir is almost emptied of oil.

Air is therefore not admitted into the reservoir to compensate for the discharge of oil, but instead the effective volume of the reservoir is reduced to the corresponding extent. The feeding out of oil from the reservoir will therefore always function in the same way regardless of what position the lubricator is assuming. This is not the case with devices of the kind that admit compressed air into the reservoir to the same degree that the oil level in it is lowered. If such a reservoir is turned so that the outfeed point is above the oil surface, the discharge of oil stops.

The double oil valve device with both a non-return valve 26 and a dosage piston 31 has been chosen for two reasons. The dosage piston alone is not sufficient to prevent the penetration of air into the reservoir 44. If the lubricator is turned so that the outfeed end of the dosage piston is pointing downwards, air can pass past the piston and into the valve housing 19 during the piston movements. The non-return valve prevents this air from entering the reservoir. The non-return valve alone is not sufficient to ensure the desired dosage. It is true that it is, substantially, intended to operate only during the brief, considerable pressure drop described above, but the degree of equalization of pressure which thereafter follows is dependent on the consumption of air of the connected tool. A tool consuming large amounts of air and causing a strong air flow will also create a considerable dynamic effect on the reservoir 44. It is therefore difficult to adjust the non-return valve so that, on the one hand, it is sensitive enough to open in the desired way and, on the other hand, is resistant enough not to continue to permit the passage of oil after the partial equalization of pressure.

Furthermore, strong surges of pressure in the opposite direction of the normal flow direction result now and then at disconnections and rearrangements of air hoses and connected air tools, and of the lubricator itself. Both the non-return valve 26 and the seals 13 and 23 must be able to withstand these pressure forces and prevent air from entering the reservoir 44.

The seal 13 should be so arranged that it produces a small amount of sliding friction in the direction of travel to the right—according to FIGS. 1 and 2— of the inner tube 12 and is thus not, due to friction against the tube, compressed in the mentioned direction, thereupon to spring back and push the tube backwards when the pressure is equalized, since this would result in air being sucked in past the seal. A lip-type seal having its lips pointing-in the direction of travel of the tube has proved to be suitable. Arranged in this way, it seals well against the penetration of air into the reservoir and is also—although its lips are strictly speaking pointing in the wrong direction—sufficiently capable of preventing oil from passing past the seal. This is because the overpressure in the direction out of the reservoir 44 is several times smaller than during the surges of air which can result in the opposite direction during disconnection operations, etc., when the reservoir is suddenly totally pressureless at one end. Furthermore, it is much easier to seal against leakage of oil than against leakage of air.

Between the inner tube 12 and the portion 10 of the outlet part, a ring-shaped space is formed, through which the compressed air can flow to the opening 42 of the outlet part when the tube has moved to a position to the right of the opening according to the drawing. In accordance with the embodiment shown, the end of the inner tube 12 which faces the seal ring 48 is cut off obliquely, so that the tube protrudes farther against the seal ring on its one side than on its diametrically opposed side; this in order that the tube shall not, when as in FIG. 2 it has reached the seal ring, seal against the latter but touch it only with the farthermost protruding portion without hindering the flow of air.

When the cover 16 has reached the position shown from FIG. 2 and practically all oil is consumed, the protruding portion of the inner tube 12 has simultaneously reached a position in which it forces aside the seal ring 48 from its sealing position in the groove 47. Compressed air now flows out through the exhaust opening 49 with its narrow portions 50, 52. The narrow passages should be made with a diameter of preferably less than 1 mm, so that the loss of pressure is insignificant and the jet of air cannot cause any damage or inconvenience. Furthermore, the arrangement of the plug 51 and the different hole areas should be such that a sharp hissing or whistling sound is produced. This sound indicates that it is time to replenish the oil.

The seal ring 48 should of course be suitably pretensioned in the groove 47. The pre-tensioning and the pressure acting on the ring, which strives to press it down into the groove, ensures sealing against the edges of the groove. Furthermore, the arrangement should be such that, when the inner tube 12 pushes away the seal ring at one point around its circumference, its remaining portions should stay in the groove and the pushed-aside portion should resume its position in the groove as soon as the end of the tube is no longer pressing against it. In this way, no manual re-setting of the sealing position is required in connection with oil replenishment. The risk of such a manual operation being neglected and a permanent leakage resulting is thus eliminated.

When a signal for oil replenishment has been received, the lubricator is disconnected from the compressed air line with the help of the quick-action couplings referred to above, whereupon it is opened, refilled and connected again in the way described in the foregoing pages.

The lubricator in accordance with the invention can be made very robust and unsensitive to rough treatment. The outer tube 4 is suitably made of steel. The inlet and outlet parts 1 and 5 can also be of the same material, or alternatively of a lighter material such as anodized aluminium in order to reduce their weight. The internal parts of the device are completely protected, and the mechanism is not sensitive to the outer shell being subjected to blows or to the lubricator being dragged about and assuming varying positions.

The lubricator in accordance with the invention can very well be made so that its outlet end is connected direct to an air tool or the like which is large enough that the weight and easiness of handling the tool is not, proportionally seen, affected too much. In this case it is also possible, within the scope of the invention, to integrate the housing 46 of the lubricator with the tool housing, to a smaller or greater extent. Other variations of the design are also possible within the scope of the invention.

When the lubricator is connected with the tool by means of a hose, as described above; the hose should be as short as it can suitably be without hampering the operator using the tool. More than 2–3 m of hose are as a rule not required between the tool and the lubricator.

The lubricator has an elongated shape and does not need to have a larger diameter than 30–35 mm. Its end parts can be made tapering towards their end surfaces in order to eliminate sharp corners which can hook onto objects and make it difficult to move the hose with the lubricator fitted on it. In this way, the lubricator integrates in a natural way with the hose and is no hindrance.

A prototype of the lubricator was made with an effective oil volume of 30 cu.cm. and a dosage so adjusted that this oil quantity could ensure sufficient lubrication of a connected air tool during approx. 3 months. For comparison it may be mentioned that an oil mist lubricator of the common venturi type may very well feed out the same amount of oil during one or two working days.

In addition to the number of starting impulses per working day for a connected tool being governing for the oil consumption, the lubricator in accordance with the invention is to a considerable degree self-adjusting to the lubrication requirement of the tool in relation to its size and consumption of air per unit of time. At a large air consumption per unit of time, the valve mechanism of the lubricator is affected by a more rapid and violent pressure drop at the moment of starting the tool than in the case of a smaller air consumption, and this results in an increased flow speed of the discharged oil. This automatic adjustment of the oil dosage is a considerable advantage.

To make the oil reservoir 44 in the form of a movable cylinder on a fixed piston formed by the protruding portion 11 of the outlet part 5 is advantageous in several ways:

Firstly, the free end of the cover 16 can be made with a slightly larger diameter than the inner tube 12—as seen from FIGS. 1 and 2—so that, when the air is flowing past the cover, a slight underpressure results on its leeward side. This underpressure and the dynamic force of the air flowing past the cover will remain substantially the same when the oil reservoir is full (FIG. 1) as when it is nearly empty (FIG. 2). The advantage of producing, in this way, a slight overpressure in the reservoir, which is maintained all the time the air is flowing, is that the oil dosage piston 31—which moves forward when the air flow is started—will be safely kept in its sealing forward end position until the flow of air is stopped. This advantage of a substantially unchanged, slight overpressure cannot be obtained in a device provided with a piston which moves in a cylinder, as is the case with the known device discussed in the foregoing.

Secondly, the seal ring 13 will be affected in an advantageous way. The pressure which acts on the cover 16 and which also, via the oil in the reservoir, acts on the upstream side of the seal ring, is only slightly higher than the air pressure acting on its downstream side. It is therefore possible to make the seal ring in the form of a lip-type seal with the lips pointing in the downstream direction. This results in a very small amount of friction of the seal against the moving inner tube, and no rolling or rocking movement of the seal which produces a return movement when the air flow is stopped. Such a return movement is disadvantageous, as it will tend to move the inner tube backwards and cause small amounts of air to leak past the seal and into the oil reservoir. As the movements are repeated several thousand times, the end result will be a large amount of air in the reservoir and malfunctioning of the oil dosage as well as the replenishment signal. A seal ring on a movable piston in a cylinder will be subjected to greater pressure changes, as the pressure alternately drops and is restored in the oil reservoir, and must have a good sealing function on the side of it which faces the reservoir in order not to admit air when the pressure in the reservoir drops. The seal will therefore have a higher friction against the cylinder and will also perform rocking or rolling movements.

Thirdly, and as described in the foregoing, it is possible to arrange the movable inner tube 4 to initiate an oil replenishment signal.

DESCRIPTION OF SECOND EMBODIMENT OF THE INVENTION

The embodiment described above is particularly suitable for air powered tools and devices which after each start are, as a rule, only operated for about ten to twenty or thirty seconds and then stopped and started again. A large number of different tools belong to this category, such as screw and nut tighteners, drilling and grinding machines, scalers, chipping hammers, etc. The momentaneous and very small dosage of oil at each start which has been described above is ideal for ensuring a correctly adjusted lubrication of these tools during their short periods of operation.

There are, however, also air powered tools and machines, for example rock drills, which are used in such a way that the lubricators used for them should be able to withstand hard treatment but which have such a large requirement of air and lubricant and/or are operated for so long periods after each start that a momentaneous discharge of lubricant at each start is not sufficient, but that a continuous discharge during the entire period of operation is better.

In order to provide for such a continuous supply of lubricant, the embodiment of the invention which has been described above can easily be modified. The compressed air valve 34 and its return spring 41 are excluded, and also the dosage piston 31. The hole portion 25d of the valve housing 19, or alternatively the hole 27 of the non-return valve 26 is provided with a dosage member 31 comprising a narrow passage which can be adjusted by means of a set screw or the like, which passage, when air flows past the orifice of the hole portion 25d and thereby produces an underpressure in the hole, effects a continuous, adjustable oil dosage in the same way as in known lubricators provided with venturi tubes or similar.

This modified embodiment being, in the first place, intended for tools and machines with a large air requirement, the underpressure at the outlet end of the valve housing 19 will be relatively important even without the special delay valve 34; hereto being added also the dynamic force of the air flow which acts on the reservoir 44.

I claim:

1. A pressure fluid actuated lubricator comprising a housing (46) having at least one pressure fluid channel (43, 42, 21) leading from an inlet opening (2) to an outlet opening (7) in said housing, a reservoir (44) for a lubricant (45) and a discharge device (19) for said lubricant provided in said housing, said discharge device communicating both with said reservoir and with a portion (21) of said channel which portion connects with said outlet opening, characterized therein that an end part (5) of said housing (46) is provided with a substantially cylindrical first portion (10) terminating in a second, substantially cylindrical portion (11), said portions extending into said housing and said first cylindrical portion having a smaller diameter than said second cylindrical portion, an opening (42) being provided in a side of said first cylindrical portion to communicate with said channel portion (21) connecting with said outlet opening, said reservoir (44) being shaped as a cylindrical reservoir (12) which is closed at one end and which with an opposite, open end is passed over said second cylindrical portion which functions as a stationary piston along which said cylindrical reservoir is movable in a longitudinal direction, and a sealing member (13) provided between said cylindrical second portion and said cylindrical reservoir, wherein said pressure fluid passes between an inner wall of the open end of the cylindrical reservoir and said smaller diameter first cylindrical portion, through said opening defined in said first cylindrical portion and through said channel portion connecting with said outlet opening when said cylindrical reservoir is moved relative to said second cylindrical portion.

2. A lubricator in accordance with claim 1, characterized therein that said sealing member (13) is made in the form of a lip seal having a lip which seals against said cylindrical reservoir (12) and which faces in a direction towards said opposite end of said cylinder.

3. A lubricator in accordance with claim 1 characterized therein that a pressure fluid exhaust opening (49), covered by a second sealing member (48), is provided in said housing (46) and that said cylindrical reservoir (12) is arranged to push aside, during a final stage of said movement of said cylinder towards an end position, said sealing member, for freeing said exhaust opening.

4. A lubricator in accordance with claim 2 characterized therein that a pressure fluid exhaust opening (49), covered by a second sealing member (48), is provided in said housing (46) and that said cylindrical reservoir (12) is arranged to push aside, during a final stage of said movement of said cylinder towards an end position, said sealing member, for freeing said exhaust opening.

5. A lubricator in accordance with claim 3, characterized therein that said pressure fluid exhaust opening (49)

is provided with at least one narrow exhaust portion (50, 52) arranged to produce a sharp hissing or whistling sound when said pressure fluid is exhausted through said narrow exhaust portion.

6. A lubricator in accordance with claim 4, characterized therein that said pressure fluid exhaust opening (49) is provided with at least one narrow exhaust portion (50, 52) arranged to produce a sharp hissing or whistling sound when said pressure fluid is exhausted through said narrow exhaust portion.

* * * * *